(12) United States Patent
Aoki

(10) Patent No.: US 8,913,837 B2
(45) Date of Patent: Dec. 16, 2014

(54) IMAGE MATCHING DEVICE AND IMAGE MATCHING METHOD

(75) Inventor: Takahiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 975 days.

(21) Appl. No.: 13/028,412

(22) Filed: Feb. 16, 2011

(65) Prior Publication Data

US 2011/0243460 A1    Oct. 6, 2011

(30) Foreign Application Priority Data

Mar. 31, 2010    (JP) .................. 2010-082732

(51) Int. Cl.
*G06K 9/62* (2006.01)
*G06K 9/74* (2006.01)

(52) U.S. Cl.
CPC .................... *G06K 9/745* (2013.01)
USPC ...................................... 382/209

(58) Field of Classification Search
None
See application file for complete search history.

(56) References Cited

U.S. PATENT DOCUMENTS

| 2004/0179738 | A1 | 9/2004 | Dai et al. | |
| 2006/0133564 | A1* | 6/2006 | Langan et al. | 378/8 |

FOREIGN PATENT DOCUMENTS

| CN | 1695166 A | 9/2005 |
| JP | 2000-222578 | 8/2000 |
| JP | 2006-163726 | 6/2006 |
| JP | 2007-78511 | 3/2007 |

OTHER PUBLICATIONS

Iftekkaruddin, et al., "Rotation-Invariant Target Recognition Using an Amplitude-Coupled Minimum-Average Correlation-Energy Filter", Optical Engineering, vol. 35, No. 4, pp. 1009-1014, Apr. 1996.*
Koichi Ito et al., "A Fingerprint Matching Algorithm Using Phase-Only Correlation", Mar. 2004, pp. 682-691.*
Russell Blyth, "The Amazing Unit Circle", Feb. 20, 2009, Mathmistakes.info, http://mathmistakes.info/facts/TrigFacts/learn/uc/nar.html.*
Chinese Office Action and Search Report issued Dec. 7, 2012 in corresponding Chinese Patent Application No. 201110047797.7.
European Search Report dated Jul. 21, 2011 for corresponding European Patent Application No. 11155969.6.
Garcia, et al., "Circular-harmonic Minimum Average Correlation Energy Filter for Color Pattern Recognition", Applied Optics, vol. 33, No. 11, pp. 2180-2187, Apr. 10, 1994.
Horner, et al., "Phase-only Matched Filtering", Applied Optics, vol. 23, No. 6, pp. 812-816, Mar. 15, 1984.
Michael J. Jones et al., "Model-Based Matching by Linear Combinations of Prototypes", IEEE 1995, Proceedings, Fifth International Conference on computer Version, Jun. 1995, pp. 531-536 (with cover pages).

(Continued)

*Primary Examiner* — Kim Vu
*Assistant Examiner* — Fred Hu
(74) *Attorney, Agent, or Firm* — Staas & Halsey LLP

(57) ABSTRACT

An image matching device includes: a mixed image generation portion generating a mixed image in an operation satisfying linearity, the mixed image being obtained by multiplying each of two or more recorded images and each of phase components of a complex plane different from each other and adding multiplied recorded images; a complex similarity image generation portion generating a complex similarity image through a similarity operation between one or more input image and the mixed image; and a similarity obtain portion obtaining similarity from a projected component of the complex similarity image toward a vector of the phase component.

20 Claims, 10 Drawing Sheets

(56) References Cited

OTHER PUBLICATIONS

Kazuyuki Miyazawa et al., "An Effective Approach for Iris Recognition Using Phase-Based Image Matching", IEEE Transactions on Pattern Analysis and Machine Intelligence, vol. 30, No. 10, Oct. 2008, pp. 1741-1756.

Barbara Zitová et al., "Image Registration Methods: A Survey", Image and Vision Computing, vol. 21, 2003, pp. 977-1000.
Chinese Office Action mailed Mar. 28, 2014 in corresponding Chinese Application No. 201110047797.7.

* cited by examiner

IMAGE MATCHING DEVICE AND IMAGE MATCHING METHOD

CROSS-REFERENCE TO RELATED APPLICATION

This application is based upon and claims the benefit of priority of the prior Japanese Patent Application No. 2010-082732, filed on Mar. 31, 2010, the entire contents of which are incorporated herein by reference.

FIELD

A certain aspect of embodiments described herein relates to an image matching device and an image matching method.

BACKGROUND

In an art of image recognition or biometric authentication, similarity between two images are often calculated. Generally, similarity between a recorded image recorded as a recorded template in advance and an input image input through a sensor or the like is calculated. A plurality of image data are often recorded in the recorded template in order to improve image matching accuracy. In this case, similarity between the input image and the plurality of the image data is calculated.

The biometric authentication includes one-to-one authentication and one-to-N authentication. The one-to-one authentication is an authentication in which a user is authenticated after the user is identified in advance with ID number or the like. The one-to-N authentication is an authentication in which matching of the plurality of recorded images of the recorded template is performed without identifying the user. With the one-to-N authentication, matching process of N number of recorded images is needed. In this case, time required for the authentication may get N times. There is a case where matching between one image and another image having different rotation angle is performed with respect to each user. In this case, the time required for the authentication may get longer. Japanese Patent Application Publication No. 2006-163726 (hereinafter referred to as Document 1) discloses an art in which the time required for the authentication is reduced with use of a plurality of image processing devices in parallel.

However, the art of Document 1 needs a plurality of image processing devices. In this case, cost may be increased.

SUMMARY

According to an aspect of the present invention, there is provided an image matching device including: a mixed image generation portion generating a mixed image in an operation satisfying linearity, the mixed image being obtained by multiplying each of two or more recorded images and each of phase components of a complex plane different from each other and adding multiplied recorded images; a complex similarity image generation portion generating a complex similarity image through a similarity operation between one or more input image and the mixed image; and a similarity obtain portion obtaining similarity from a projected component of the complex similarity image toward a vector of the phase component.

According to an aspect of the present invention, there is provided an image matching method including: generating a mixed image in an operation satisfying linearity, the mixed image being obtained by multiplying each of two or more recorded images and each of phase components of a complex plane different from each other and adding multiplied recorded images; generating a complex similarity image through a similarity operation between one or more input image and the mixed image; and obtaining similarity from a projected component of the complex similarity image toward a vector of the phase component.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
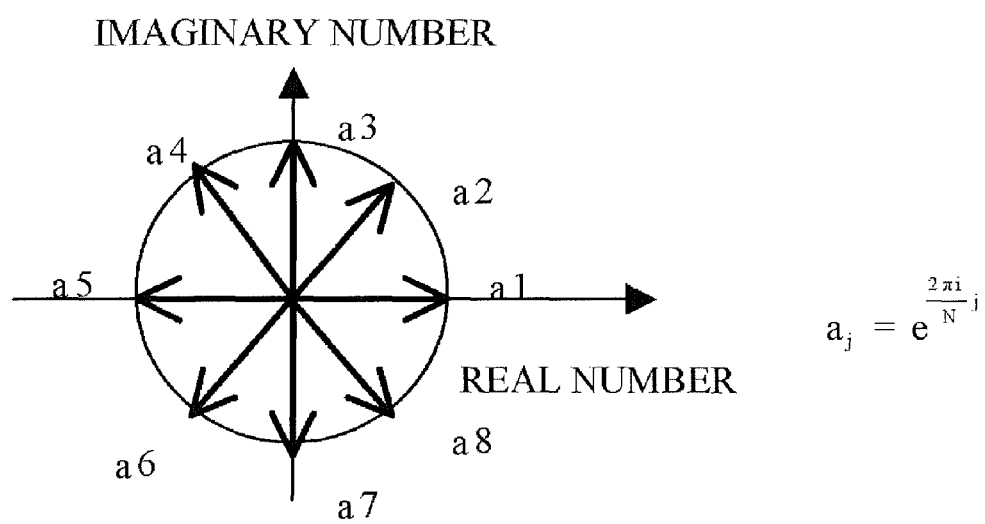
FIG. 1 illustrates a phase parameter $a_j$.

A description will be given of a POC (Phase Only Correlation) as an example of an image matching operation method. The POC is an image matching operation method between images having linearity. For example, a function "f" and a function "g" mean an image respectively. A coefficient $a_1$ and another coefficient $a_2$ are a given constant value. In this case, an operation "*" satisfies linearity if the operation "*" is expanded as the following Equation (1).

$$(a_1 f_1 + a_2 f_2) * g = a_1 (f_1 * g) + a_2 (f_2 * g) \quad \text{[Equation 1]}$$

In the POC, a cross correlation function is calculated with use of a convolution theorem of Fourier transform. In the method, normalization of frequency component of the cross correlation function removes intensity information. Thus, only phase information may be used.

An output image of the POC has the same size as an image before the operation. Hereinafter, the output image of the POC is referred to as a similarity image. A value of a coordinate (x, y) of the similarity image indicates a correlation value in a case where a parallel movement is applied to a recorded image and a matching image. Therefore, a search for the parallel movement is not needed, when the POC is used. In the matching with use of the POC, a maximum of the similarity image is used as similarity.

In the POC, the intensity information is removed. It is therefore possible to restrain influence of specific frequency on the correlation function. In the POC, a distinct peak appears in the similarity image between identical images (a recorded image and a matching image of a user). On the other hand, the similarity between different images (a recorded image of a user and a matching image of another user) indicates approximately zero. Therefore, identification accuracy between a user and another user is enlarged in the POC.

First, a description will be given of a cross correlation function of two functions. The cross correlation function is a function indicating similarity between two images to which a parallel movement is applied. A convolution operation of the function f(x) and the function g(x) has only to be executed in accordance with Equation (2) after one of the function f(x) and the function g(x) is flipped, in order to calculate the cross correlation function between the function f(x) and the function g(x). In Equation (2), a function h(x) is the cross correlation function between the function f(x) and the function g(x). The flip of an image corresponds to complex conjugation after the Fourier transform.

$$f(x) \otimes g(x) = \int_{-\infty}^{+\infty} f(x-y)g(y)dy = h(x) \quad \text{[Equation 2]}$$

A convolution theorem using the Fourier transform is known as a method for executing a convolution operation speedily. A description will be given of the convolution theorem with reference to Equation (3) through Equation (6). In accordance with Equation (3) and Equation (4), each of the function f(x) and the function g(x) is Fourier-transformed, and a function $F(\omega)$ and a function $G(\omega)$ are obtained. "FFT" of Equation (3) and Equation (4) indicates the Fourier transform. "$\omega$" is a variable indicating a frequency.

$$F(\omega) = FFT(f(x)) \quad \text{[Equation 3]}$$

$$G(\omega) = FFT(g(x)) \quad \text{[Equation 4]}$$

Next, in accordance with Equation (5), a product between the function $F(\omega)$ and the function $G(\omega)$ is referred to as a function $H(\omega)$. When the function $H(\omega)$ is subjected to reverse Fourier transform, a convolution function between the function f(x) and the function g(x) is obtained. Thus, a relation of Equation (6) is obtained. Therefore, the convolution operation in a real space is replaced to a simple product in a frequency space. The operation of the Fourier transform executed with a fast FFT is faster than a direct calculation of the convolution.

$$F(\omega) \cdot G(\omega) = H(\omega) \quad \text{[Equation 5]}$$

$$H(\omega) = FFT(h(x)) \quad \text{[Equation 6]}$$

A description will be given of the POC with reference to Equation (7) through Equation (13). First, a function $F'(\omega)$ is calculated through normalization of the function $F(\omega)$ in accordance with Equation (7). The function $F'(\omega)$ corresponds to the feature data of the function $F(\omega)$ of an image. And, in accordance with Equation (8), a function $G'(\omega)$ is calculated through normalization of the function $G(\omega)$. The function $G'(\omega)$ corresponds to the feature data of the function $G(\omega)$ of an image. Next, in accordance with Equation (9), a product of the function $F'(\omega)$ and the complex conjugation of the function $G'(\omega)$ is calculated, and thus, a function $H'(\omega)$ is obtained. In accordance with Equation (10), the function H'(w) is subjected to a reverse Fourier transform, and thus, a function h'(x) is obtained. The function h'(x) is a similarity image to be calculated.

$$F'(\omega) = \frac{F(\omega)}{|F(\omega)|} \quad \text{[Equation 7]}$$

$$G'(\omega) = \frac{G(\omega)}{|G(\omega)|} \quad \text{[Equation 8]}$$

$$H'(\omega) = F'(\omega) \cdot G'(\omega) \quad \text{[Equation 9]}$$

$$h'(x) = IFFT(H'(\omega)) \quad \text{[Equation 10]}$$

The function h'(x) is an output result of the POC, and is a cross correlation function in a case where the function f(x) and the function g(x) of two images moves by "x" in parallel. A maximum of the function h'(x) is used as similarity. A coordinate X allowing the maximum indicates parallel movement amount of the function f(x) and the function g(x). That is, with the POC, the maximum of the similarity in which the parallel movement between images is considered can be calculated when only the maximum of the cross correlation function is searched, without the parallel movement of images. The POC satisfies linearity because the Fourier transform satisfies linearity.

Next, a description will be given of an image matching operation between N number of recorded images (the recorded template) and one input image in the biometric authentication. A mixed image of Equation (11) is calculated through linear combination of each image with use of points $a_1, a_2$ to $a_N$ on a unit circle of a complex space as a coefficient, in a case where N number of recorded images $f_1, f_2$ to $f_N$ are recorded. Hereinafter, the point $a_j$ is referred to as a phase parameter.

$$\hat{f} = a_1 f_1 + a_2 f_2 + \ldots + a_N f_N \quad \text{[Equation 11]}$$

FIG. 1 illustrates a phase parameter $a_j$. In FIG. 1, a horizontal axis indicates a real number, and a vertical axis indicates an imaginary number. The phase parameter $a_j$ is expressed as $a_j = \exp(i\theta_j)$. "i" is an imaginary number unit. "$\theta_j$" is a phase angle with respect to j-th recorded image. Each of points dividing the unit circle of FIG. 1 into N number of equal parts may be the phase parameter $a_j$ acting as a concrete setting value. In the case of FIG. 1, the "N" is 8.

Next, the similarity operation "*" is executed between the mixed image made of the N number of the recorded images and the input image "g". With the operation, an expanded equation expressed as Equation (12) is obtained with the linearity of the similarity operation "*". Therefore, the operation result between the mixed image and the input image "g" has a structure in which the operation result of the recorded image $f_j$ (j=1, 2, to N) and the input image are coupled with the phase parameter $a_j$. Hereinafter, the operation result of Equation (12) is referred to as a complex similarity image.

$$\hat{f}*g = (a_1 f_1 + a_2 f_2 + \ldots + a_N f_N)*g = a_1(f_1*g) + a_2(f_2*g) + \ldots + a_N(f_N*g) \quad \text{[Equation 12]}$$

Figure 2:
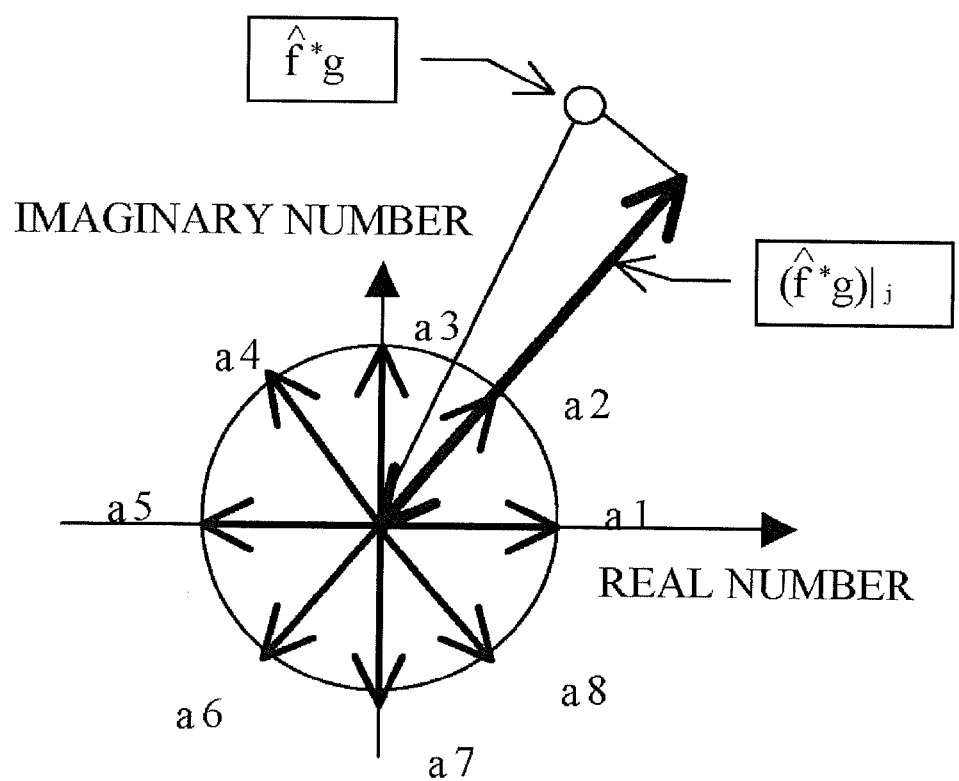
FIG. 2 illustrates a concept of Equation (13)

Next, the phase parameter $a_j$ is treated as a vector, and a projected component is calculated. That is, the parameter $a_j$ is treated as a vector, and an inner product between the operation result of Equation (12) and the phase parameter $a_j$ is calculated. The calculation result of projected amount is expressed as Equation (13). FIG. 2 illustrates a concept of Equation (13). In Equation (13), a code "$|_j$" indicates a projected component toward a direction of the phase parameter $a_j$. "$\Delta\theta_{kj}$" indicates an angle between k-th phase parameter and j-th phase parameter. The operation result of Equation (13) may be used as similarity operation result with respect to $(f_j*g)$.

$$\hat{f}*g|_j = \cos\Delta\theta_{1j}(f_1*g) + \cos\Delta\theta_{2j}(f_2*g) + \ldots + \cos\Delta\theta_{Nj}(f_N*g) \quad \text{[Equation 13]}$$

It is assumed that $f_j$ is a recorded data of the biometric authentication. In this case, the number of image corresponding to the input image "g" is one at a maximum. $(f_j*g)$ is zero or near zero, when the recorded image data $f_j$ is of different user with respect to the input image "g". On the other hand, when a user of the input image "g" is the same as that of k-th recorded image $f_k$, $(f_j*g)$ is zero or near zero with respect to "j" that is not equal to "k". On the other hand, Equation (14) is obtained because cos $\Delta\theta_{kk}$=1. Thus, an operation result (approximate value) between the k-th recorded image and the input image "g" is obtained.

$$\hat{f}*g|_k \cong (f_k*g) \qquad \text{[Equation 14]}$$

As mentioned above, a value that is approximately equal to $(f_j*g)$ is obtained, when an operation between a mixed image and an input image is executed once and a projected component toward the phase parameter $a_j$ according to the obtained operation result is obtained. The similarity operation "*" is executed only once in the process sequence. Therefore, the operation process is performed speedily. In the POC, most of the time required for the similarity operation is FFT operation time and IFFT operation time. With the above-mentioned sequence, similarity between a plurality of images is calculated when IFFT is executed only once. It is therefore restrain the enlargement of the time required for the operation.

A description will be given of the effect of the use of the phase parameter $a_j$ of complex number. It is assumed that the phase parameter $a_j$ of complex number is not used and $a_j$=1 with respect to all "j". In this case, the mixed image is expressed as Equation (15). The projection operation result is expressed as Equation (16). In the similarity operation, the similarity $(f_j*g)$ between all of the recorded images and the input image is added simply. Thus, noise caused by the similarity between images of different users is added N times. And, identification accuracy may be degraded. On the other hand, the phase is shifted in the embodiment. Thus, two $(f_j*g)$ on diagonal line of the point $a_j$ of FIG. 1 cancel each other. It is therefore possible to reduce the noise.

$$\hat{f} = f_1 + f_2 + \ldots + f_N \qquad \text{[Equation 15]}$$

$$\hat{f}*g|_j = (f_1*g) + (f_2*g) + \ldots + (f_N*g) \qquad \text{[Equation 16]}$$

Even if large similarity is obtained as a result of the projection operation in a case where the $(f_j*g)$ is simply added, it is difficult to determine an image contributing to the similarity. In the biometric authentication, it is not determined whose recorded image contributes to the large similarity. In contrast, in the embodiment, the projected component toward $a_j$ of the projection operation is approximately the same as the similarity based on the according image $f_j$. Therefore, it is determined which recorded image corresponds to the input image.

In the above description, it is a condition that the plurality of images ($f_1$, $f_2$ to $f_N$) are not similar to each other. When the plurality of images are similar to each to an extent, the interference of similarity is reduced by giving a shift (parallel movement) to the images.

For example, it is assumed that a single image having variable rotation angles is used as a plurality of images. In concrete, a base recorded image "f" having variable rotation angles acts as images $f_1$, $f_2$ to $f_N$. The similarity between the recorded images and the input image has a peak at a specific angle $\theta$. On the other hand, relatively large similarity is obtained at an angle $\theta'$ near the angle $\theta$. In this case, a coordinate of the peak of the similarity (position of parallel movement) is equal to each other even if the peak value of each similarity is different from each other. It is therefore possible to restrain interference between peaks of the similarity when a different shift (parallel movement) is set on the images $f_1$, $f_2$, to $f_N$.

Next, a description will be given of a case where a plurality of different images are similar to each other, not a case where a single image is rotated. In this case, parallel movement amount allowing a peak of the similarity between images $f_1$, $f_2$ to $f_N$ is calculated in advance by performing the matching between the recorded images. Further, it is possible to restrain the interference between the peaks of the similarity by determining the shift amount so that the parallel movement amount is not overlapped.

Next, a description will be given of a space shift. In the Fourier transform, circulation is established with respect to the x-axis. That is, the function f(x) satisfies the relation "f(x)=f(x+L)". "L" is an image size. This is because an image data having a limited size data is treated as an image data having unlimited size in the Fourier transform, and the image data circulates. It is therefore possible to obtain the original operation result by setting a reverse shift after executing the operation after the image shift.

In the above description, the coefficient $a_j$ satisfies the relation "$|a_j|$=1". Therefore, the coefficient $a_j$ indicates a point on the unit circle of the complex space. However, the coefficient $a_j$ may not be on an identical unit circle. In this case, for example, the coefficient $a_j$ is set to be a general complex number, and the normalization process may be performed at last.

If $a_j$ is a general complex number, $a_j$ may be expressed as "$a_j = b_j + ic_j$". "$b_j$" is a real part. "$c_j$" is an imaginary part. "i" is an imaginary unit. The coefficient $a_j$ is expressed as Equation (17). However, Equation (18) is satisfied.

$$a_j = r_j e^{i\theta_j} \qquad \text{[Equation 17]}$$

$$r_j = \sqrt{b_j^2 + c_j^2} \qquad \text{[Equation 18]}$$

If the coefficient $a_j$ is expressed as above, the mixed image of Equation (12) is expressed as Equation (19). The similarity operation of Equation (12) between the mixed image and the input image "g" is expressed as Equation (20).

$$\hat{f} = r_1 e^{i\theta_1} f_1 + r_2 e^{i\theta_2} f_2 + \ldots + r_N e^{i\theta_N} f_N \qquad \text{[Equation 19]}$$

$$\hat{f}*g = r_1 e^{i\theta_1}(f_1*g) + r_2 e^{i\theta_2}(f_2*g) + \ldots + r_N e^{i\theta_N}(f_N*g) \qquad \text{[Equation 20]}$$

It is assumed that the similarity between the image $f_2$ and the input image g is high, and the other similarity between other images are approximately zero. In this case, the projected image in a phase direction of the coefficient $a_2$ allows relations as Equation (21) and Equation (22). It is therefore possible to obtain an approximate value of a desirable similarity through the normalization with use of the absolute value $|a_j|$ of the coefficient $a_j$ after calculating the projected image in the phase direction of the coefficient $a_j$, when similarity of the images combined with the coefficient $a_j$ is calculated.

$$\hat{f}*g|_{j=2} \cong 0 + r_2 e^{i\theta_2}(f_2*g) + \ldots + 0 = r_2(f_2*g) \qquad \text{[Equation 21]}$$

$$(f_2*g) \cong \frac{(\hat{f}*g|_{j=2})}{r_2} \qquad \text{[Equation 22]}$$

In accordance with the embodiment, the similarity operation "*" is executed only once in the sequence process. Therefore, fast operation process is performed. It is therefore possible to reduce the authentication time. In this case, it is not necessary to use a plurality of image processing devices. Therefore, cost increase is restrained.

[First Embodiment]

Figure 3:
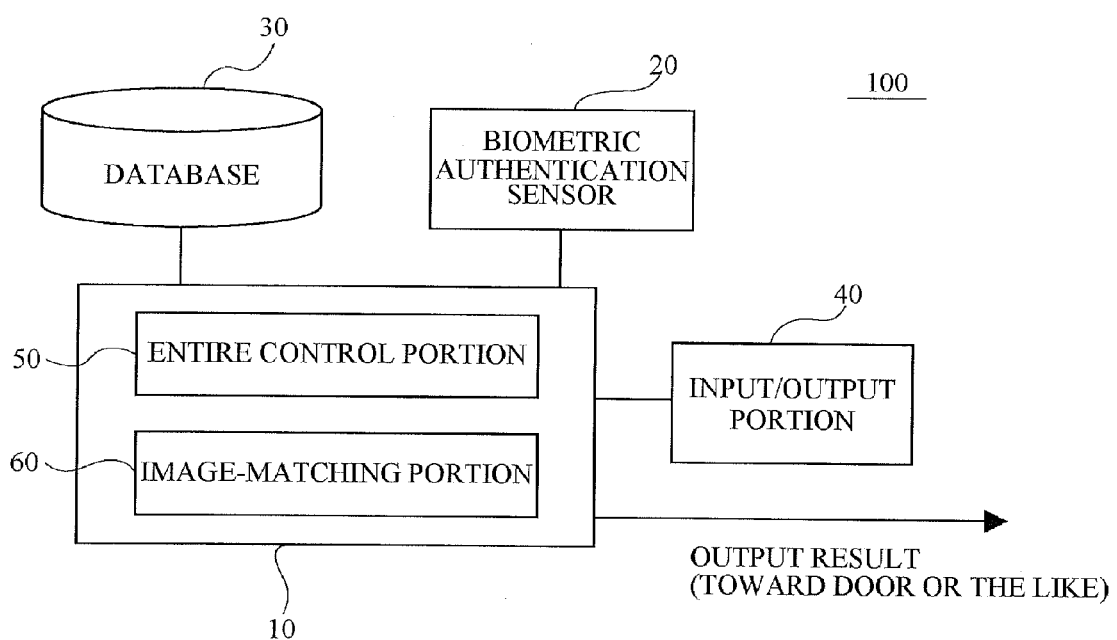
FIG. 3 illustrates a function block diagram for describing biometric authentication system.

A description will be given of a biometric authentication system 100 in accordance with a first embodiment. The biometric authentication system 100 executes the above-mentioned operation process. FIG. 3 illustrates a functional block diagram for describing the biometric authentication system 100. As illustrated in FIG. 3, the biometric authentication system 100 includes a matching process portion 10, a biometric authentication sensor 20, a database 30, an input/output portion 40 and so on. The matching process portion 10 includes an entire control portion 50 and an image matching portion 60.

The entire control portion 50 entirely controls the biometric authentication system 100. The biometric authentication sensor 20 is a sensor for obtaining an image of biological feature of a user. The database 30 stores biological information such as a recorded image of each user. The input/output portion 40 is an interface for transmitting an instruction to a user and receiving an ID for identifying the user. The input/output portion 40 is such as a liquid crystal monitor, a keyboard or a touch panel. The image matching portion 60 calculates similarity between the recorded image stored in the database 30 and an input image from the biometric authentication sensor 20.

Figure 4:
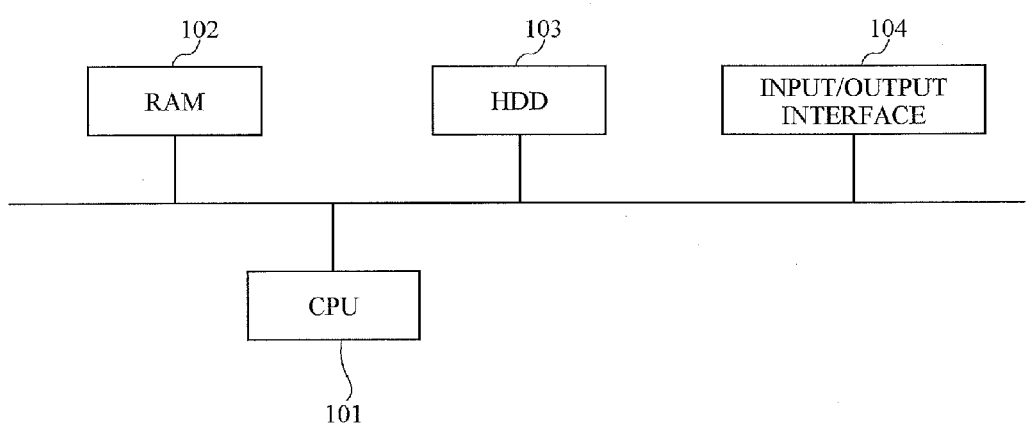
FIG. 4 illustrates a configuration diagram of the biometric authentication system.

FIG. 4 illustrates a configuration diagram of the biometric authentication system 100. As illustrated in FIG. 4, the biometric authentication system 100 includes a CPU (Central Processing Unit) 101, a RAM (Random Access Memory) 102, a HDD (Hard Disk Drive) 103, an input/output interface 104 and so on. Each component is coupled with a bus or the like. The entire control portion 50 and the image matching portion 60 are established when the CPU 110 executes a program stored in the HDD 103 or the like. The input/output interface 104 acts as the input/output portion 40.

In the embodiment, one-to-one biometric authentication is described as an example. A rotation is considered as a posture fluctuation of biological body. The POC is used as the image matching method. The input/output portion 40 receives an ID from a user in order to perform the one-to-one authentication. The image matching portion 60 uses the input ID and identifies the user, obtains a recorded image of the user from the database 30, and performs the matching process.

In the following description, the matching process with respect to a single recorded image will be described. However, the matching process is applied to a plurality of recorded images by repeating a similar process. In this case, the matching process may be performed with respect to each recorded image with the following sequence, and a maximum of similarity may be output as a final result.

The image matching portion 60 performs the image matching process in accordance with an instruction of the entire control portion 50. The image matching portion 60 receives a recorded image, an input image, a matching parameter and so on. The recorded image is a recorded biological data of a user. In the embodiment, the image matching portion 60 receives one recorded image of a specific user of the recorded image data of the database 30 in order to perform the one-to-one authentication.

The input image is a biological image obtained by the biometric authentication sensor 20. In the embodiment, the input image is a single image. The matching parameter is a condition for the matching process. In concrete, the matching parameter is a rotation angle condition with respect to an image. The database 30 stores the matching parameter. The matching parameter may be stored as a list including rotation angles of θ=−4 degrees, −2 degrees, zero degree and so on. The matching parameter may include a maximum angle, a minimum angle, an angle step and so on. In the embodiment, the image matching portion 60 receives the list of the rotation angle from the database 30. In the embodiment, nine rotation angles of θ=−8 degrees, −6 degrees, −4 degrees to +8 degrees that are changed by 2 degrees in plus minus 8 degrees range are used.

Next, parameters and codes are defined in advance for describing the structure of the image matching portion 60. The recorded images of a user are expressed as $f_2$ and so on. In the embodiment, one of the recorded images is used. So, only the recorded image $f_1$ is actually used. The input image is expressed as "g". The rotation angle of an image is expressed as Angle (Idx). The Angle (Idx) is a list including rotation angles according to the index Idx. For example, Angle (1)=−8 degrees.

An objective image and the number of the angles for the matching process of the image matching portion 60 and the index are expressed as follows. These are the same in a second embodiment or later. In the embodiment, both the recorded image and the input image are single image. Therefore, Ct1=1, and Ct2=1.

Figure 5:
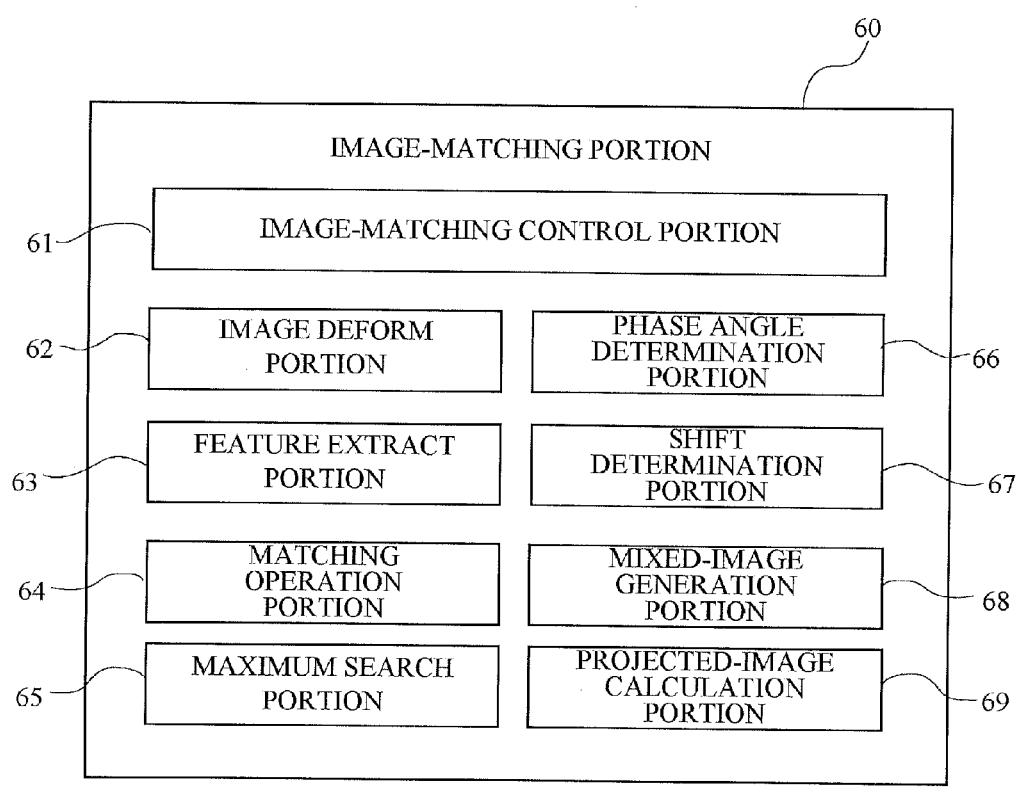
FIG. 5 illustrates a function diagram for describing details of an image matching portion.

The number of the recorded images: Ct1=1
The index of the recorded image: Idx=1
The number of the input image: Ct2=1
The index of the input image: Idx2=1
The number of the angles Ct3=9
The index of the angle: Idx3=1, 2, to 9
The list of the angle: Angle (1)=−8 degrees
    Angle (2)=−6 degrees
    Angle (3)=−4 degrees
    . . .
    Angle (9)=+8 degrees FIG. 5 illustrates a functional block diagram for describing details of the image matching portion 60. The image matching portion 60 acts as an image matching control portion 61, an image deform portion 62, a feature extract portion 63, a matching operation portion 64, a maximum search portion 65, a phase angle determination portion 66, a shift determination portion 67, a mixed image generation portion 68 and a projected image calculation portion 69.

The image matching control portion 61 entirely controls the image matching process. The image matching control portion 61 controls the image deform portion 62, the feature extract portion 63, the matching operation portion 64, the maximum search portion 65, the phase angle determination portion 66, the shift determination portion 67, the mixed image generation portion 68 and the projected image calculation portion 69, and performs the matching process.

The image deform portion 62 performs a process deforming an image according to a posture fluctuation of the biological body. The image deform portion 62 sets an image to be deformed and a deformation parameter, and outputs an image obtained through deformation. In the embodiment, a rotation angle of an image is used as the deformation parameter of an image.

The feature extract portion 63 extracts the biological feature data from the recorded image and the input image. In the embodiment, the POC method is adopted. Therefore, the biological feature data corresponds to $F'(\omega)$ of Equation (7) and $G'(\omega)$ of Equation (8). In the following description, $F'(\omega)$ is referred to as a recorded feature data $F'(\omega)$, and $G'(\omega)$ is referred to as an input feature data $G'(\omega)$.

The feature extract portion 63 performs a pre-process on the input image before performing a feature extract process. In concrete, the feature extract portion 63 cuts off the input image, downsizes the input image, or the like. The cutting-off process is a process for extracting an area of the input image required for the biometric authentication. The downsizing process is a process for converting the input image size into a power-of-two size in order to apply the input image to the POC. With the processes, application of fast Fourier transformation is possible. In the embodiment, the feature extract portion 63 downsizes the input image so that the size of the input image is converted into a size of 128×128 pixels.

The matching operation portion 64 calculates similarity between the biological feature data of the input data and the biological feature data of the recorded image. The matching operation portion 64 calculates a product between the recorded feature data F'(ω) and the input feature data G'(ω) in accordance with Equation (9), and calculates a similarity image h'(x) through reverse Fourier transformation in accordance with Equation (10).

The maximum search portion 65 searches a maximum calculated by the matching operation portion 64, and outputs the maximum as similarity. The maximum search portion 65 outputs a coordinate (MX, MY) allowing the maximum. The coordinate (MX, MY) allowing the maximum indicates a positional shift between the recorded image and the input image. When the coordinate value is large, the value is used for applying a disabling process of the matching process result. This is because an overlapping area between the recorded image and the input image is reduced, when the positional shift is large. When the overlapping area is lower than a given area, reliability of the matching process is reduced. Therefore, it may be determined that the matching is failed. The maximum search portion 65 transmits the coordinate (MX, MY) allowing the maximum to the image matching control portion 61 together with the maximum.

The phase angle determination portion 66 determines the phase angle θ during the image matching. The phase angle θ is "θ" part of a constant part exp(iθ) of linear coupling. The phase angle determination portion 66 determines the phase angle from the type of the objective image (the recorded image or the input image), conditions Idx1, Ct1, Idx2, Ct2, Idx3, Ct3 or the like.

The shift determination portion 67 determines a shift amount in the image matching. The shift determination portion 67 determines the shift amount from the type of the objective image (the recorded image or the input image), conditions Idx1, Ct1, Idx2, Ct2, Idx3, Ct3 or the like.

The mixed image generation portion 68 calculates a mixed image in accordance with Equation (11). The mixed image generation portion 68 sets a phase parameter and the shift amount according to the determination result of the phase angle determination portion 66 and the shift determination portion 67, and calculates the mixed image.

The projected image calculation portion 69 projection-operates for calculating a desirable similarity image from a complex similarity image calculated from the mixed image in accordance with Equation (13). In this case, the projected image calculation portion 69 executes projection-operates based on phase angle information obtained from the phase angle determination portion 66. The projected image calculation portion 69 executes a shift operation in a reverse direction in order to cancel the shift amount given to each image during the generation of the mixed image, after calculating the projected image.

Here, a description is given of a logic for determining the phase angle $θ_j$. For two images $f_j$ and $f_k$, if the phase parameter is set as $Δθ_{jk}$=90 degrees, the two images are set in a position having no correlation. For example, a condition that $a_1$=1 (real number) and $a_2$=i is the case. The condition corresponds to the case where one image is set on the real part, and another image is set on the imaginary part, when the Operation of Equation (12) is executed. It is therefore preferable that the phase parameters of images of which interference is to be avoided are different from each other by 90 degrees.

In the embodiment, the phase parameter of nine (=Ct3) images having different rotation angle is calculated. In this case, it is thought that images adjacent to each other are similar to each other. Therefore, phase difference of 90 degrees or near 90 degrees is set on the images adjacent to each other. In concrete, the phase angle $θ_j$ increases by ¼ of angle obtained by dividing 2π into 9 equal parts as the index Idx3 increase by one, because the nine (=Ct3) images are located on a circumference (=2π).

Figure 6:
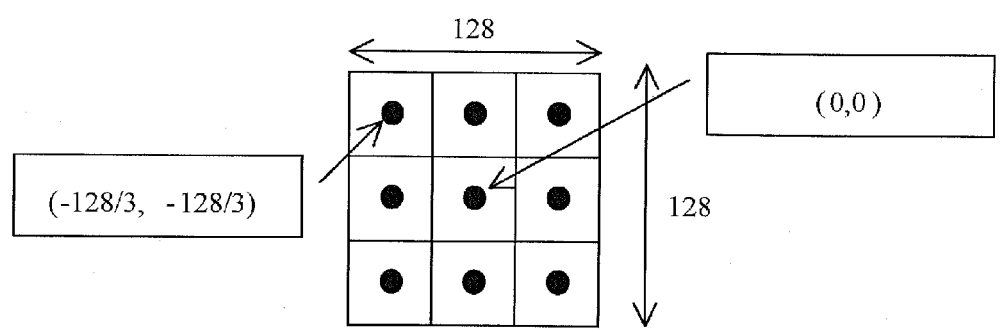
FIG. 6 illustrates space shift amount.

FIG. 6 illustrates the space shift amount. In the embodiment, nine (=Ct3) different images are coupled into a single mixed image. A space shift in the coupling may be determined as follows. A size of an objective image is 128×128 pixels. Next, with reference to FIG. 6, the image is divided into 3×3 blocks. Each coordinate of a center of the blocks is defined as the space shift amount. In this case, a center of the image is defined as (0, 0). For example, a parallel movement amount according to the upper left block is (−128/3, −128/3) that is nearly equal to (−43, −43). The other space shifts are determined in the same way. The space shift amount can be allocated equally to the nine images.

The number of the recorded images and the number of the rotation angles are determined in advance. Therefore, it is not necessary to change the condition dynamically. And so, the database 30 may store the pre-determined phase angle θ and the pre-determined space shift amount in a table.

Figure 7:
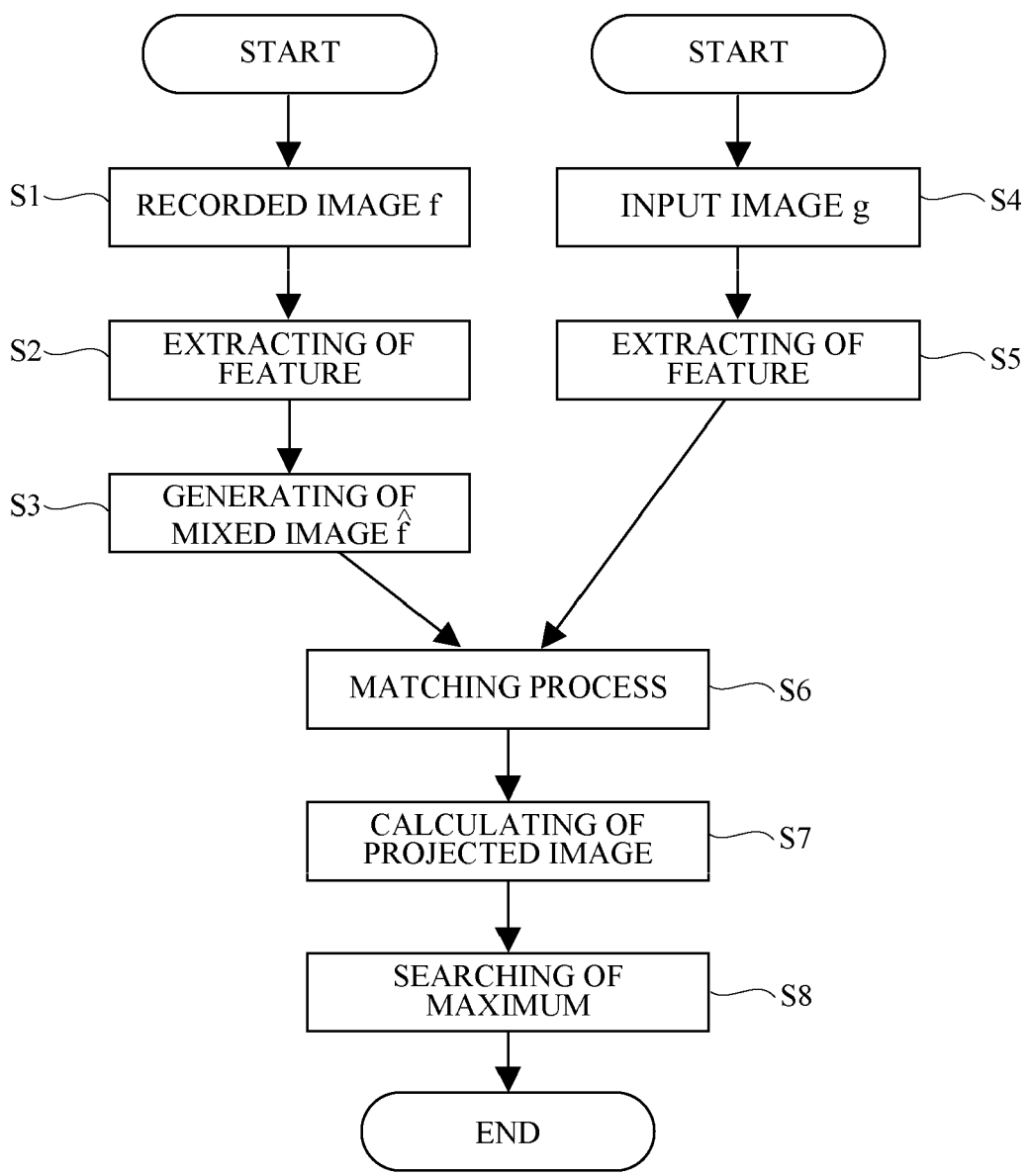
FIG. 7 illustrates a flowchart for describing a flow of an image matching process.

A description will be given of a flow of the image matching process of the image matching portion 60 with reference to FIG. 7. As illustrated in FIG. 7, the feature extract portion 63 obtains a feature data from a plurality of images $f_1$, $f_2$ to $f_9$ that are rotated images of the recorded image (Step S1). In this case, a space shift amount (SX, SY) is set on the feature extract portion 63 as a parameter. Next, the feature extract portion 63 gives a designated space shift amount to the image $f_j$, and performs the feature extract process (Step S2). In concrete, the normalization process of Equation (7) is performed. In this case, each frequency component may be weighted. For example, generally, a high frequency wave component includes relatively much noise and includes inappropriate information for the image matching. So, authentication accuracy is improved when a filtering process is applied so that weight of the high frequency wave component is lower than that of low frequency component.

Next, the mixed image generation portion 68 generates a mixed image with respect to the recorded image of which feature is extracted (Step S3). In this case, the phase angle determination portion 66 determines a value of the phase parameter $a_j$. Next, the feature extract portion 63 performs the feature extract process with respect to the input image "g" (Step S5). In concrete, the normalization process of Equation (8) is performed.

Next, the matching operation portion 64 calculates a complex similarity image between the obtained mixed image and the extracted feature data G'(ω) of the input image "g" (Step S6). Therefore, the matching operation portion 64 acts as a complex similarity image generation portion. On the other hand, the projected image calculation portion 69 calculates a projected image with respect to the phase parameter $a_j$ of the complex similarity image in order to calculate the similarity with respect to the required recorded data $f_j$ (Step S7). The projected image calculation portion 69 executes a reverse operation of the space shift with respect to the calculated similarity image. The reverse operation is a process for returning the image to which the space shift (SX, SY) is given during the feature extract process to an original position by giving reverse space shift (−SX, −SY) during the similarity operation.

The projected image calculation portion 69 calculates the similarity image of Equation (13) with respect to j=1, 2, to 9 in order. The maximum search portion 65 obtains the maximum (Step S8). Thus, the similarity is obtained. Therefore, the projected image calculation portion 69 and the maximum search portion 65 act as a similarity obtain portion. The maximum search portion 65 may obtain the coordinate (MX, MY) allowing the maximum. The image matching portion 60 outputs the result as similarity at an according rotation angle and information of positional shift (MX, MY). With the steps, the flowchart will be terminated.

In the flowchart of FIG. 7, the image is rotated after the feature extraction. However, the process is not limited to the above. In the embodiment, the Fourier transform is performed as the feature extract process in order to apply the POC as the image matching. In the case of the Fourier transform, a result of a calculation in which an image is subjected to the Fourier transform and the rotation in order is the same as a result of another calculation in which an image is subjected to the rotation and the Fourier transform in order. Therefore, the order of the feature extraction process and the rotation process may be reverse. It is however preferable that the Fourier transform is performed first, because operation process of the Fourier transform weighs more than the rotation process of the image.

Figure 8:
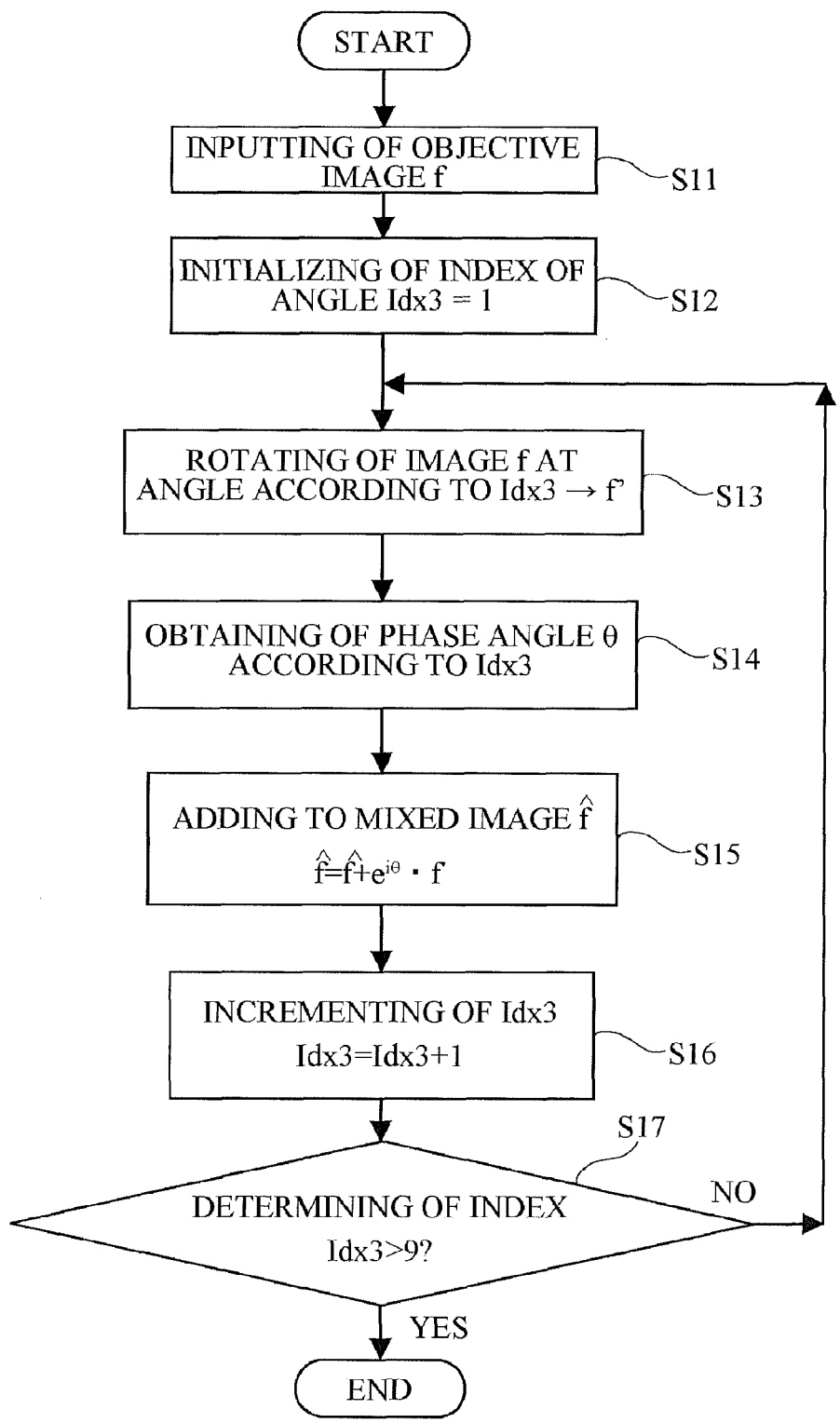
FIG. 8 illustrates a flowchart for describing an example of a generation process of a mixed image in Step S3 of FIG. 7.

FIG. 8 illustrates a flowchart for describing an example of the generation process of the mixed image in Step S3 of FIG. 7. As illustrated in FIG. 8, the mixed image generation portion 68 obtains the objective image "f" (Step S11). The objective image "f" corresponds to the feature extract image of the recorded image. Next, the mixed image generation portion 68 initializes the index Idx3 of angle (Step S12).

Next, the image deform portion 62 generates an image "f" that is rotated image of the objective image "f" at an angle according to Idx3(=Angle(Idx3)) (Step S13). Next, the mixed image generation portion 68 obtains the phase angle θ according to the index Idx3 from the phase angle determination portion 66 (Step S14). Next, the mixed image generation portion 68 generates the mixed image in accordance with Equation (11) (Step S15).

Next, the index Idx3 is increased by one (Step S16). Then, the mixed image generation portion 68 determines whether the index Idx3 is larger than a predetermined value (9 in this embodiment) (Step S17). When it is determined "No" in Step S17, Steps S13 to S16 are executed again. When it is determined "Yes" in Step S17, the flowchart will be terminated. With the flowchart, the mixed image may be generated with respect to all of the rotation angles.

In the embodiment, the biological feature data of each user is recorded in the database 30. However, the structure is not limited to the above embodiment. For example, the calculation process of the mixed image and the reading process of the biological feature data are performed in parallel. In concrete, the mixed image may be generated while a user inputs an ID and the biometric authentication sensor 20 reads the feature image. In this case, the process may get faster. And, the mixed image may be calculated in advance and may be stored in the database 30. In this case, the plurality of the image $f_j$ and the feature data may not be stored.

When the recorded image is subjected to the deform process, although there is a merit of reduction of process time, degree of freedom may be restricted because the deformation process is applied in advance. That is, it is not possible to use another rotation angle other than the rotation angles set in advance. And so, not the recorded image but the input image may be subjected to the image deform process. In this case, the freedom degree may be improved with respect to the posture fluctuation.

Both of the image deform processes may be combined. For example, the similarity operation with respect to wider angle may be executed, when rotation angle is set on both the recorded image and the input image. In the embodiment, the recorded image has a rotation angle of −8 degrees to +8 degrees. When similar operation is executed after a rotation angle of +18 degrees is set on the input image, similarity according to a rotation angle of +10 degrees to +26 degrees may be calculated. Thus, similarity according to an angle out of the range set on the recorded image may be obtained. With the structure, the rotation angle range (−8 degrees to +8 degrees) may be used. And, it is possible to change the posture fluctuation flexibly according to environment around the biometric authentication system 100, location of the biometric authentication system 100 or the like.

In the embodiment, the rotation is an example of deformation of an image. However, the structure in not limited. For example, similar process may be performed with use of scaling up, scaling down, general affine transform, projection transform, and so on. A description will be given of another image deformation.

[Another Image Deformation]

The image deform portion 62 may perform another image deformation process with respect to a received index. The following deformation may be performed with respect to a coordinate (x, y) when scaling up process or scaling down process of an image is performed.

$$x'=\alpha x$$

$$y'=\alpha y$$

"α" is a parameter indicating the scaling up or the scaling down. In the case of the scaling up, "α" satisfies "α>1" (for example, "α" is 1.2). In the case of the scaling down, "α" satisfies "α<1" (for example, "α" is 0.9). A relation between "α" and the Idx3 may be set in advance. For example, "α" may be set as follows.

$$\alpha(1)=0.9$$

$$\alpha(2)=1.0$$

$$\alpha(3)=1.1$$

In this case, the image deform portion 62 performs the image matching process according to the scaling up transform and the scaling down transform with use of the setting values.

In the affine transform, similar process may be performed. For example, the affine transform with respect to the coordinate (x, y) may be expressed as follows.

$$x'=ax+by+c$$

$$y'=dx+ey+f$$

The above equations have six independent parameters of "a", "b", "c", "d", "e", and "f". A relation between the enlarging/contradicting and the Idx3 with respect to the above parameters may be set in advance. In the affine transform, the parameters "c" and "f" indicate the parallel movement. In the embodiment, the POC is applied. Therefore, the parameter of parallel movement is not needed. Thus, actually, there are four independent parameters of "a", "b", "d", and "e".

A transform equation of the projection transform is expressed as follows.

$$x' = (a_1 x + b_1 y + c_1)/(a_0 x + b_0 y + c_0)$$

$$y' = (a_2 x + b_2 y + c_2)/(a_0 x + b_0 y + c_0)$$

The above equations have nine independent parameters of "$a_0$", "$b_0$", "$c_0$", "$a_1$", "$b_1$", "$c_1$", "$a_2$", "$b_2$", and "$c_2$". The relation of the Idx3 with respect to the parameters may be set in advance.

[Second Embodiment]

In a second embodiment, a description will be given of one-to-N authentication. In the case of the one-to-N authentication, the maximum search portion 65 obtains a maximum of similarity with respect to N number of the mixed images. And, the maximum search portion 65 acts as a determination portion, and determines that there is no appropriate user in the N number of users if the maximum is lower than a predetermined value. In this case, it may be determined that there is no appropriate user, when a maximum Pa of an absolute value of the complex similarity image is obtained and the maximum Pa is equal to or lower than a predetermined value. That is, an upper limit of maximum may be estimated by obtaining the maximum Pa, because |cos θ| satisfies |cos θ|≤1 and maximum of the similarity image in each phase direction calculated with the projection operation fails to exceed the maximum Pa. In this case, an appropriate user is determined by obtaining a phase direction allowing the maximum Pa.

The image deformation is not considered in the embodiment. The structure is established when a biometric authentication sensor is designed so that an input biological data is not rotated. If the input image is rotated in advance, the image rotation may be corrected in advance.

The mixed image generation portion 68 generates a mixed image with use of a plurality of recorded data. In this case, recorded images of different users are used as the recorded images $f_j$(j=1, 2 to N). In this case, the operation of the phase angle θ and the space shift is executed easily, because images of different users hardly correspond to each other in the biometric authentication. The phase angle θ may divide a circle equally. The shift amount may not be given.

A plurality of recorded images may be used per one user. In this case, there is a problem of interference between similarities, because the similarity between the recorded images of the same user may be high. Therefore, the interference of peaks of the similarity may be minimalized by setting the phase angle θ and the space shift.

As an example, a description will be given of a case where three recorded images of the same user are used as recorded data. Similarity of recorded data ($f_1A$, $f_2A$, $f_3A$) of a user A is calculated in advance, and parallel movement amount (MX, MY) is calculated in advance. The value is used as a correction with respect to the shift amount (SX, SY) during the mixed image generation. The corrected shift amount (SX', SY') is expressed as (SX+MX, SY+MY).

Positions of the plurality of recorded images are matched by setting the parallel movement amount (MX, MY). A description similar to the first embodiment is established when the positions are matched and after that the space shift (SX, SY) is added. That is, it is naturally assumed that peak positions (parallel movement amount) are the same in a case where rotation is used as the image deformation. However, the parallel movements may not correspond to each other in the case of the plurality of the recorded images. It is therefore necessary to correct with the matching in advance.

It is preferable that similar images are located at positions allowing little interference, with respect to determination of the phase parameter $θ_j$. For example, it is preferable that 2π is divided equally as illustrated in FIG. 1 and recorded data are arranged from the first one in order.

Figure 9:
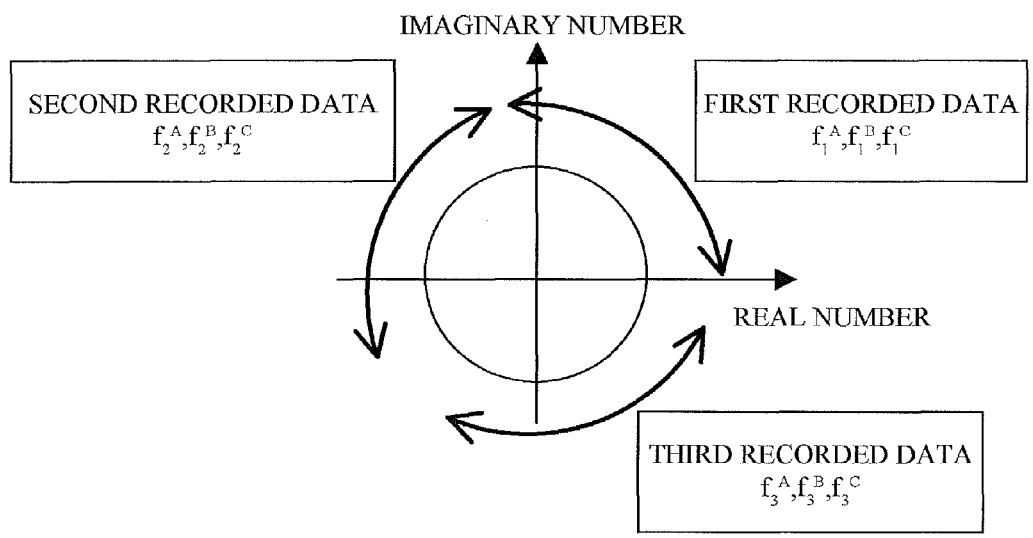
FIG. 9 illustrates an arrangement of a recorded image.

The number of recorded images is "M" per one user. The number of the recorded users is "N". In this case, total number of the recorded images is (M·N). And so, the recorded images are arranged on each angle that is 2π equally divided into (M·N) parts. Serial numbers of the recorded images are Idx=1, 2, to MN. (Idx/N) indicates the serial number of the recorded image. (Idx mod N) indicates the serial number of the user. That is, (Idx/N) indicates a first recorded image if (Idx/N) of which decimal point is cutoff is zero. (Idx/N) indicates a second recorded image if (Idx/N) of which decimal point is cutoff is one. "mod" indicates remainder. If (Idx mod N) is zero, the user A is appropriate. If (Idx mod N) is one, the user B is appropriate. The arrangement allows the arrangement of FIG. 9.

In the above description, a single input image is used. However, a plurality of input images may be used. For example, a plurality of images may be obtained sequentially during the obtaining of the biological data, and may be used for the image matching. The authentication accuracy is expected to be improved when the plurality of input images are used.

In this case, similarity is calculated by calculating a mixed image with respect to a plurality of input images. A phase angle of the phase parameter $a_j$ is set as follows, when the total number of the recorded images is "N" (total number considering the plurality of the recorded images and rotation angles), and the total number of the input images is "M".

Phase angle of recorded image: $a_j = [2π/N]*j$

Phase angle of input image: $a_k = [2π/(N·M)]*k$

In the condition, the similarity between the j-th recorded image (j=0, 1, to (N−1)) and the k-th input image (k=0, 1, to (M−1)) corresponds to the projected component of $θ_{jk}$=(2π/N)·j+(2π/(N·M))·k of a complex similarity image. Dummy image may be overlapped with the images.

With the method, a third party cannot find an original image data, even if the feature data is leaked. On the other hand, similarity can be calculated normally, if similarity operation is executed with respect to the biometric authentication feature data of actual user. For example, in the case of the above-mentioned example, the feature data may be an overlapped image between a single feature image of the actual user and two biological feature images of different user instead of three feature images.

In the embodiment, the deformation such as rotation is not performed. However, the deformation such as rotation may be replaced by a combination of the process of the first embodiment. The authentication accuracy may be lower than the one-to-one authentication because a noise (similarity between different user's images) is on the similarity calculated from the mixed image. Therefore, the similarity calculated from the mixed image and the calculation of the parallel movement amount may be used only in refining. That is, the one-to-one authentication may be executed for a recorded data of a user of which similarity calculated from a mixed image is high.

In this case, the parallel movement amount (MX, MY) is calculated in advance. It is therefore not necessary to calculate the similarity image h'(x) with respect to all images in the one-to-one authentication. And, the similarity image h'(x) has only to be calculated only with respect to an image near (MX, MY). In the calculation using the POC, the IFFT (reverse Fourier transform) operation in a predetermined range corresponds to the calculation. Thus, the operation time is reduced.

[Third Embodiment]

Figure 10:
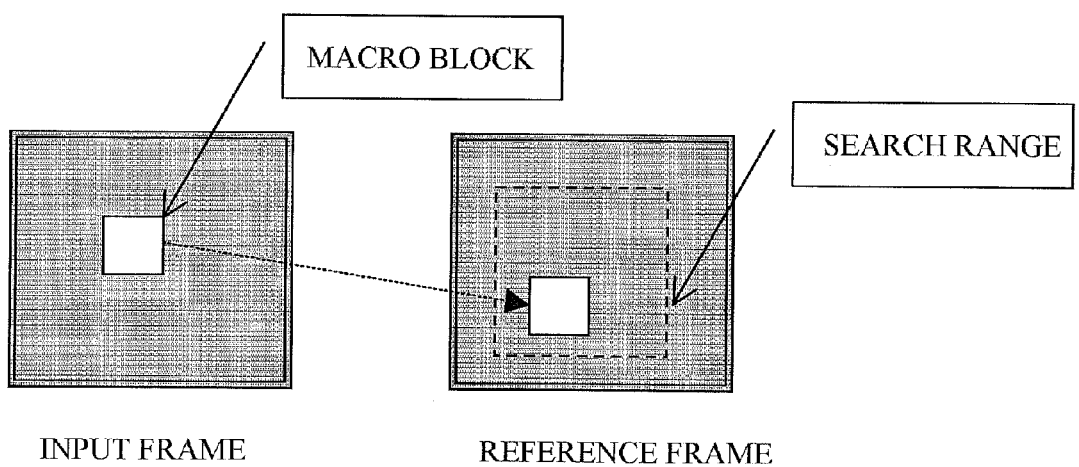
FIG. 10 illustrates a schematic view of a matching of a macro block.

A third embodiment is a case where a macro block is applied to the matching as an application example to a dynamic image compression. FIG. 10 illustrates a schematic view of the macro block applied to the matching. As illustrated in FIG. 10, the present input image is divided into blocks having a predetermined size (for example, 16×16 pixels). Each macro block searches an according position with respect to an image area in a reference frame. In this case, "search area" is set on the image area in the reference frame. The "search area" is an area to which a range allowing a parallel movement as a reference of an objective macro block is added. The image matching is performed in the range. In this case, the size of the macro block is different from that of the "search area". Therefore, it has only to enlarge the macro block to the size of the "search area", to relate zero to the enlarged area, and to enlarge the size of the macro block to that of the "search area".

Here, the "reference frame" is a frame used as a reference. However, the reference frame is not limited to a single frame. There is a case where a plurality of reference frames are provided. Thus, a load of the matching process is increased in proportion to the number of the reference frames. A motion vector in the plurality of the reference frames is searched speedily with use of Equations (3) through (13). In concrete, a mixed image is calculated with use of a plurality of reference frames with a method similar to the above embodiments, similarity between the mixed image and an objective macro block is calculated. High accuracy matching is expected in the motion-compensation of the dynamic image compression. Therefore, a candidate frame is refined with the matching, after that, the matching process is performed speedily by executing the high accuracy one-to-one matching.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An image matching device comprising:
    a mixed image generation unit that generates a mixed image in an operation satisfying linearity, the mixed image being obtained by multiplying each of two or more recorded images by each of phase components of a complex plane different from each other and adding multiplied recorded images;
    a complex similarity image generation unit that generates a complex similarity image through multiplying one or more input image by the mixed image; and
    a similarity obtain unit that obtains similarity from a projected component of the complex similarity image toward a vector of the phase component.

2. The image matching device as claimed in claim 1, wherein the phase components different from each other are points of a unit circle of the complex plane.

3. The image matching device as claimed in claim 2, wherein the phase components different from each other are points dividing the unit circle of the complex plane into equal parts.

4. The image matching device as claimed in claim 1, wherein the similarity obtain unit normalizes the phase component when obtaining a projected component toward the vector of the phase component.

5. The image matching device as claimed in claim 1, wherein the mixed image generation unit generates the mixed image after adding different space shift to each of the recorded images.

6. The image matching device as claimed in claim 1, wherein the similarity operation is Phase Only Correlation.

7. The image matching device as claimed in claim 1, wherein the recorded image includes an image subjected to a plurality of posture fluctuations with respect to a given recorded image.

8. The image matching device as claimed in claim 1, wherein the recorded image includes biological data of a plurality of users that is different from each other.

9. The image matching device as claimed in claim 1 further comprising a determination unit that determines that a user of the input image is not included in the recorded images when a maximum of absolute values of complex similarity images generated by the similarity image generation unit is lower than a predetermined value.

10. The image matching device as claimed in claim 1, wherein the mixed image generation unit adds a dummy image data to the mixed image when generating the mixed image.

11. An image matching method comprising:
    generating a mixed image in an operation satisfying linearity, the mixed image being obtained by multiplying each of two or more recorded images by each of phase components of a complex plane different from each other and adding multiplied recorded images;
    generating a complex similarity image through multiplying one or more input image by the mixed image; and
    obtaining similarity from a projected component of the complex similarity image toward a vector of the phase component.

12. The method as claimed in claim 11, wherein the phase components different from each other are points of a unit circle of the complex plane.

13. The method as claimed in claim 12, wherein the phase components different from each other are points dividing the unit circle of the complex plane into equal parts.

14. The method as claimed in claim 11, wherein the phase component is normalized when obtaining a projected component toward the vector of the phase component, in the obtaining of the similarity.

15. The method as claimed in claim 11, wherein the mixed image is generated after different space shift is added to each of the recorded images, in the generating of the mixed image.

16. The method as claimed in claim 11, wherein the similarity operation is Phase Only Correlation.

17. The method as claimed in claim 11, wherein the recorded image includes an image subjected to a plurality of posture fluctuations with respect to a given recorded image.

18. The method as claimed in claim 11, wherein the recorded image includes biological data of a plurality of users that is different from each other.

19. The method as claimed in claim 11 further comprising determining that a user of the input image is not included in the recorded images when a maximum of absolute values of complex similarity images generated by the similarity image generation portion is lower than a predetermined value.

20. The method as claimed in claim 11, wherein a dummy image data is added to the mixed image when the mixed image is generated, in the generating of the mixed image.

* * * * *